United States Patent [19]

Moore

[11] Patent Number: 5,678,350
[45] Date of Patent: Oct. 21, 1997

[54] FISH LURE

[76] Inventor: Mark H. Moore, 5 Lakeview Dr., Haines City, Fla. 33844

[21] Appl. No.: 329,421

[22] Filed: Oct. 27, 1994

[51] Int. Cl.⁶ .................................................. A01K 85/00
[52] U.S. Cl. .................... 43/42.37; 43/42.33; 43/42.31; 43/42.39; 43/42.15
[58] Field of Search .............................. 43/42.53, 42.33, 43/42.37, 42.32, 42.31, 42.39, 42.24, 42.15

[56] References Cited

U.S. PATENT DOCUMENTS

| | | | |
|---|---|---|---|
| 2,511,117 | 6/1950 | Loeb | 43/43.16 |
| 2,587,264 | 2/1952 | Wood . | |
| 2,764,834 | 10/1956 | Klein . | |
| 2,776,518 | 1/1957 | Felmlee . | |
| 2,820,314 | 1/1958 | Scott . | |
| 2,847,791 | 8/1958 | Simmons . | |
| 3,068,604 | 12/1962 | Nyberg . | |
| 3,218,750 | 11/1965 | Lewin . | |
| 3,293,791 | 12/1966 | Hinkson . | |
| 3,367,060 | 2/1968 | Abercrombie | 43/42.33 |
| 3,528,189 | 9/1970 | Lilley, Jr. . | |
| 3,585,749 | 6/1971 | Dieckmann . | |
| 3,735,518 | 5/1973 | Kleine et al. . | |
| 3,861,073 | 1/1975 | Thomassin | 43/42.37 |
| 3,861,075 | 1/1975 | Ingram | 43/42.37 |
| 3,868,784 | 3/1975 | Sabol | 43/42.37 |
| 3,909,974 | 10/1975 | Kent | 43/42.37 |
| 4,464,857 | 8/1984 | Olszewski . | |
| 4,747,228 | 5/1988 | Giovengo | 43/42.37 |
| 5,016,387 | 5/1991 | Beaupre . | |
| 5,131,182 | 7/1992 | Ising | 43/42.53 |
| 5,193,299 | 3/1993 | Correll et al. . | |

*Primary Examiner*—Kurt Rowan
*Attorney, Agent, or Firm*—Penrose Lucas Albright; Eric S. Albright

[57] ABSTRACT

A fishing lure is molded to have the appearance of a fish from silicone rubber, a flexible plastic-like translucent material. It mimics the movements of a fish by means of its shape, flexible material, buoyancy and a hinged section. The lure reflects light well, especially accentuating movement, via colorful and reflective foil or ribbon centrally embedded within the lure's translucent material. It has a hook with a shank that is embedded within the material and projects from this material to form an eyelet for fastening a fishing line or lead. This fishing lure also has a weight embedded within the material in the lower, from part of the body which further aids the lure's mimicry of fish movements. A rattle is embedded approximately midway in the body which transmits faint intermittent sound underwater. The weight, specific gravity of the silicone material, and the mass of the hook combine to cause the lure to descend in water at a selected rate of one foot per one to ten seconds. The lure's smooth and slightly convex sides with curved upper and lower edges and the deployment of the hook-shank and weight provide it with excellent casting qualities, especially when attempting to skip the lure across the surface of the water to enter areas that are hard to reach.

4 Claims, 4 Drawing Sheets

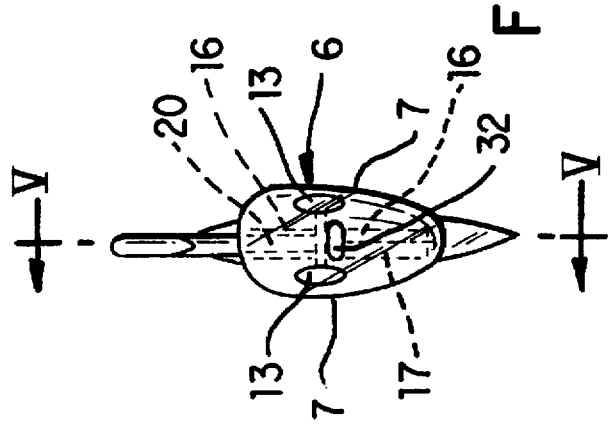
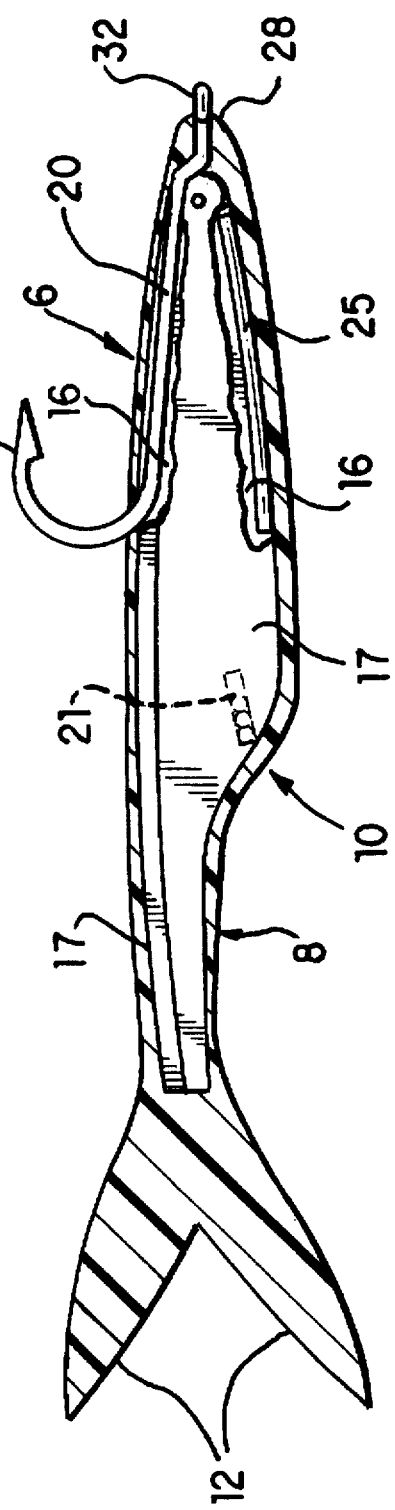

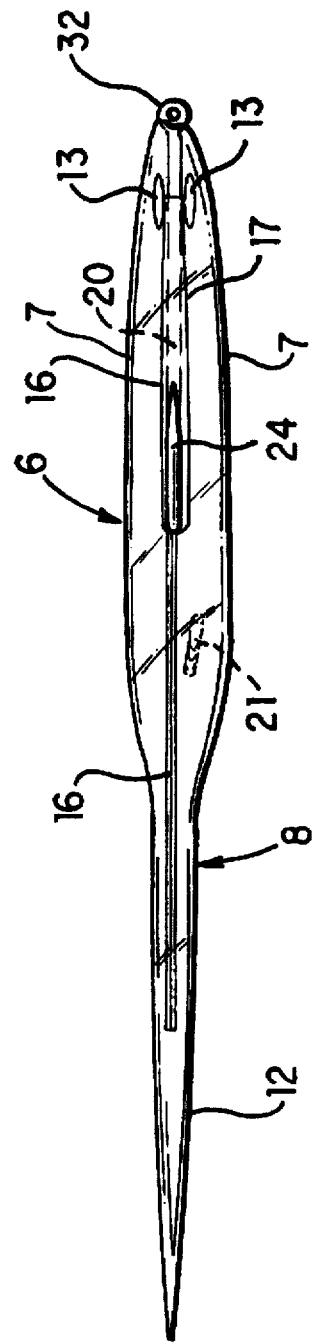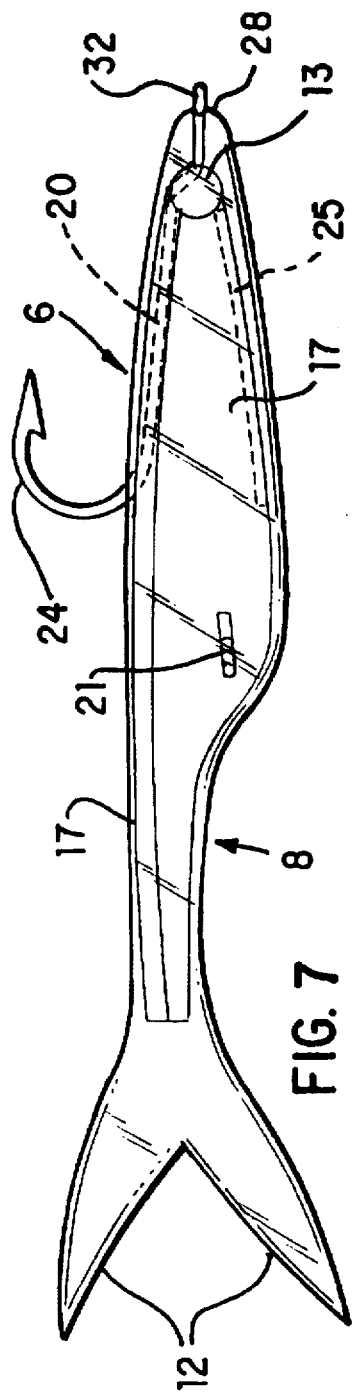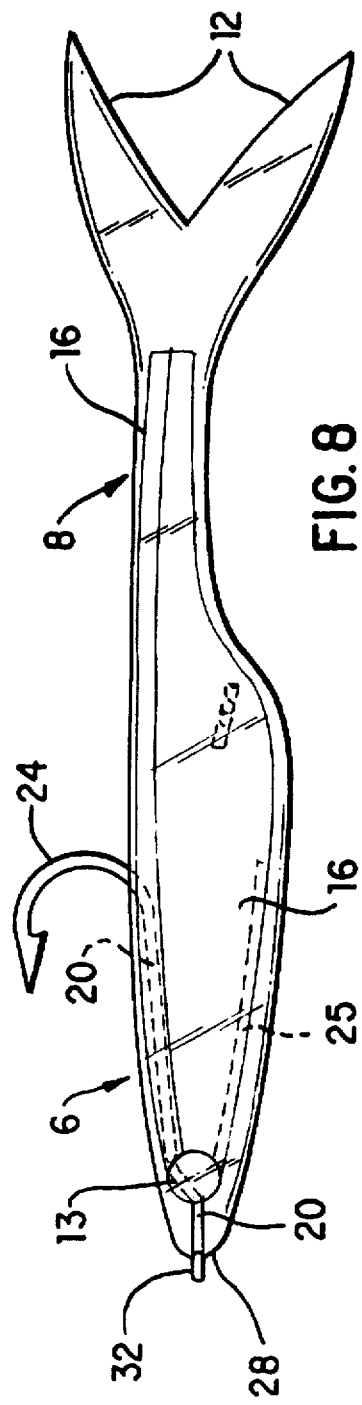

FISH LURE

FIELD OF THE INVENTION

The invention relates to fishing lures that have the general appearance of fish, and more particularly to lures which mimic swimming motions when passing through water, attract fish with reflective material, and have improved casting capabilities.

BACKGROUND OF THE INVENTION

Fishing lures are predicated upon the fact that a fish will attempt to eat almost anything in the water that it can fit in its mouth. The word "almost" in the preceding sentence has led to nearly endless discussion and theories by those who believe they are skilled anglers. Even so, it is also well-known that at times fish do not seem to bite on anything, and at other times are exceptionally selective in the lures which attract them. From a nearly endless supply of theories and discussions why this is so, the inventor has concluded that a superior lure should have certain qualities based on behavior observed in game fish. They are:

Fish are attracted to lures that:
 a) have the appearance of an aquatic creature;
 b) mimic the movements of an aquatic creature;
 c) reflect light well, especially reflections that accentuate movement and mimic reflective characteristics of fish about the same size as the lure; and
 d) transmit faint intermittent sounds underwater.

An important consideration in designing a lure with the foregoing factors in mind is that many desirable game fish often abide in places difficult to reach by normal casting.

Further, a successful lure must be easy to manufacture and, therefore, inexpensive to the consumer and easy to use.

The history of fishing predates recorded human history and a multitude of fishing lure designs have been proposed and used.

For example, U.S. Pat. No. 3,068,604 which issued to S. Nyberg on Dec. 18, 1962 shows a fish lure shaped like a fish and made of a flexible material hinged to enhance the mimicry of fish-like movement. Further, the lure is augmented with a sonic source to produce faint sounds underwater. Still further, the lure is dyed and painted to resemble a fish.

U.S. Pat. No. 3,735,518, issued to R. A. Kleine, et al. on May 29, 1973, also describes a lure shaped like a fish and made of a flexible material hinged to mimic fish-like movements. It has gauze-like embedded material to provide added strength without detracting from the action of the hinge. It also offers a plurality of points of attachment for fish-hooks. The arrangement of the fish-hooks affects the lateral deviation of the lure at the hinges to cause different movements characteristics of the bait-fish the lure is intended to mimic. In addition, it may be colored.

U.S. Pat. No. 2,776,518 which issued to J. T. Felmlee on Jan. 8, 1957, again, shows a lure shaped like a fish. The material is of deformable plastic. To obtain erratic fish-like movement, the tail is deformed out of alignment with the longitudinal axis of the body. The body is provided with a pair of stabilizer ribs and an embedded weight for stability. Also, the body is colored and shaded to resemble a fish. The hook and fishing line are connected to the lure by a rod that extends through the longitudinal axis of the body and has eyelets at both ends.

U.S. Pat. No. 2,820,314 to D. D. Scott of Jan. 21, 1958 shows a lure made of flexible material that resembles a fish. The material of the lure is a sponge-like material coated with water-repellant substance that prevents the surrounding water from being absorbed into the body. The user may, by squeezing and releasing the lure either out of the water or underwater, adjust the proportion of water retained in the body and thereby obtain a desired buoyancy of the lure. The hook is embedded within the lure as well as a weight that provides stability.

The fishing lure described in U.S. Pat. No. 2,847,791 to C. C. Simmons of Aug. 19, 1958, is composed of a flexible material that resembles a fish. Wiggling motion is obtained by projections from the tail fins that have forward facing pockets and rear faces which are convexly curved creating a pressure differential as the bait is moved forward through the water that in turn causes the tail to move back and forth laterally. Desired stability is gained by sloped and grooved pectoral fins on the sides of the body U.S. Pat. No. 3,218,750 to I. I. Lewin dated Nov. 23, 1965 discloses a fish-shaped lure composed of flexible material. The lure acquires fish-like movements while traveling forward through water by a bib depending from the tail piece with a forward facing scoop that creates a spring effect on the lure. In both embodiments of this patent, the fishing line and the hook share a common engagement support within the lure's body. It also has a weight embedded within its material to provide the desired stability and buoyancy.

U.S. Pat. No. 3,293,791 to C. L. Hinkson of Dec. 27, 1966 shows a lure utilizing the body of a bait fish with a wire loop apparatus connected to a fishing line inserted into the body through the mouth of the bait fish. Weights and hooks are connected to the wire loop apparatus either directly or indirectly. To gain erratic fish-like movement, the user distorts the wire loop within the tail so that the tail is out of alignment with the longitudinal axis of the body.

U.S. Pat. No. 3,585,749 to E. R. Dieckmann which issued Jun. 22, 1971 displays a lure in the shape of a fish composed of a flexible material. This patent teaches employing internal chambers with intake openings, deflector valves and discharge jets to cause fish-like motions. An internal sponge-like material which is adapted to absorb differing quantities of water, as desired, is used to provide the lure with the desired stability and buoyancy.

U.S. Pat. No. 5,193,299 to R. P. Correll, et al. dated Mar. 16, 1993 discloses a fish-shaped lure composed of a flexible material. Fish-like movement is provided by a deflection plate depending from the tail section and stabilizing wings projecting from the sides of the body. It also includes a weight or brace in the front or head section for enhancement of the lure's stability and buoyancy and to lend mass and stiffness to the forward end which dampens forward end oscillations. Also, the lure may be colored by either dye or paint to resemble a fish.

U.S. Pat. No. 3,528,189 to D. L. Lilley of Sep. 15, 1970 teaches the use of left and right hand profile photographs of a fish that are respectively embedded within two transparent, rigid plates that approximate the shape of a fish body with colorful foil sandwiched between the two photographs. The plates are connected and sealed in a water-proof manner. Hook and fishing line attachments are rigidly connected to the plates.

U.S. Pat. No. 2,764,834 to H. E. Klein presents colorful foil sandwiched between two transparent and rigid plates. The plates approximate the shape of a fish body. Hook and fishing line attachments are screwed to the plates.

U.S. Pat. No. 2,587,264 to H. M. Wood of Feb. 26, 1952 discloses a lure that comprises a relatively inflexible metal base generally shaped like the body of a fish covered by reflective material to attract fish to the lure. The metal base is curved to cause erratic motion as the lure passes through water. The hook is attached by a nut and bolt combination and the fishing line is connected to the lure through an opening in the body.

U.S. Pat. No. 4,464,857 which issued to D. P. Olszewski on Aug. 14, 1984 is for a lure having a relatively inflexible clear plastic covering shaped like the body of a fish over a representation of a fish that in turn covers a central core that incorporates hook hangars, fishing line eyelets and weights.

U.S. Pat. No. 5,016,387, issued to P. A. Beaupre on May 21, 1991 describes a tear drop shaped lure with reflective wings. The wings are composed of a resilient material having a "memory" that returns them to their original shaped if deformed. The wings are reflective and contoured so that the lure spins as it is drawn through water and reflective flashes emphasize the spin.

None of the aforementioned patents discloses or teaches a lure adapted for casting into areas that are difficult to reach by ordinary casting techniques such as a cove wherein its banks are inaccessible and which is overhung by foliage or rock.

Although the Nyberg and Kleine, et al. patents teach lures which mimic fish-like movements, using a hinge in the body, they do not teach attracting attention to such movements by embedding reflective material within a translucent lure body.

The patents to Wood, Lilley, Kleine and Beaupre, on the other hand, teach lures that attract fish with colorful, reflective material, but they do not appreciate the advantage of embedding the reflective material within translucent, flexible material that attracts game fish to fish-like movements of their lures.

Although the patents to Lewin, Simmons, and Correll, et al. disclose lures that seek to mimic fish-like movements as they pass through water by means of a scoop or bib depending perpendicularly from the tail section made of flexible material, the perpendicularly depending scoop or bib is an unfishlike physical characteristic and, to that extent, their lures are less likely to attract game fish.

In a similar manner, the methods disclosed in the patents to Felmlee and Hinkson to mimic fish-like movements by their lures as they are dram through water, by bending the tail away from the longitudinal axis of the body, tend to impart an unnatural, unfishlike movements that, again, causes their lures to be less likely to attract potential prey.

The patents of Dieckmann's and Olszewski's disclose lures which are relatively expensive to manufacture and otherwise distinct from the instant invention.

The same is true with respect to the lure disclosed in the patent to Scott which is relatively complex for anglers to use.

Accordingly, despite a great variety of fish lure designs, there is a need for a fishing lure that, in combination, is adapted to be cast into otherwise unreachable or difficult to reach areas, attracts fish with its shape, movement and reflective qualities, encourages reflex strikes of the game fish by its movement in conjunction with its reflective qualities, uses sound to attract fish, is relatively inexpensive to manufacture and is easy to use.

SUMMARY OF THE INVENTION

The present invention is a fishing lure that is inexpensive to manufacture, easy to use and that has the appearance of a fish, mimics the movements of a fish by means of its shape, flexible material, buoyancy and a hinged section, reflects light well, especially accentuating a fish-like movement, via colorful and reflective material embedded within the lure's translucent material, transmits a faint cyclical sound under-water by means of a small rattle, and is further shaped and weighted to provide skipping properties so that it can be cast without undue difficulty to hard-to-reach places.

BRIEF DESCRIPTION OF THE DRAWINGS

FIG. 4 is a forward elevational view of the lure shown in FIG. 1.

FIG. 5 is a starboard-side elevational view in cross-section taken on line V—V in FIG. 4.

FIG. 6 is a top plan view of an alternative embodiment of the present invention.

FIG. 7 is a starboard-side elevational view of the lure shown in FIG. 6.

FIG. 8 is a port-side elevational view of the lure shown in FIG. 6.

DESCRIPTION OF THE PREFERRED EMBODIMENTS

Figure 1:
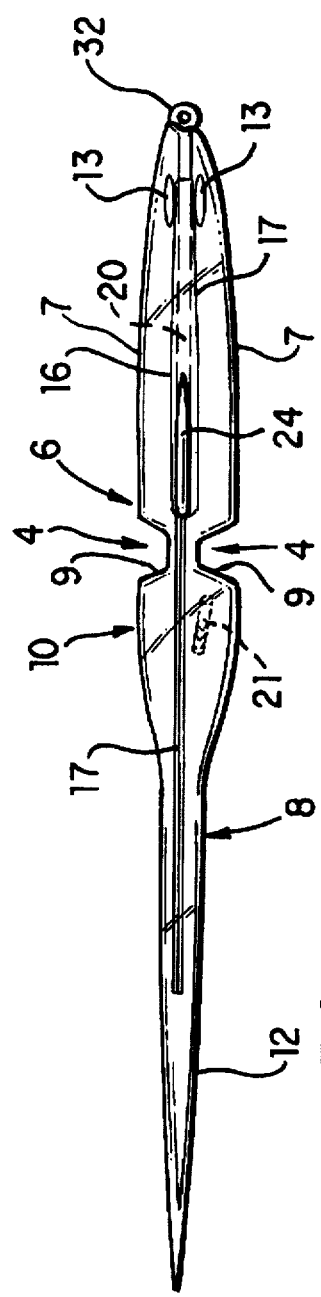
FIG. 1 is a top plan view of the present invention.

Referring to FIGS. 1 through 5, a fish lure is molded from translucent or transparent, plastic, flexible material, preferably industrial silicone, to form a single unit in the general shape of a fish with five sections, forward body 6, hinge 4, aft body 10, tail 8 and fins 12. The silicone provides durability to the lure, even after numerous successful casts.

Forward body 6 is molded with hinge 4 defining its aft portion and constitutes the forward part of the lure. Forward body 6 tapers forwardly from hinge 4 converging to nose 28 from which eyelet 32 protrudes, and has smooth and slightly convex sides 7 with curved upper and lower edges. Smooth and slightly convex sides 7 assist, along with the tapering of forward body 6 to nose 28, in producing darting action of the lure when moved through water that encourages a reflex strike by a game fish. The configuration also improves the casting qualities of the lure.

Figure 2:
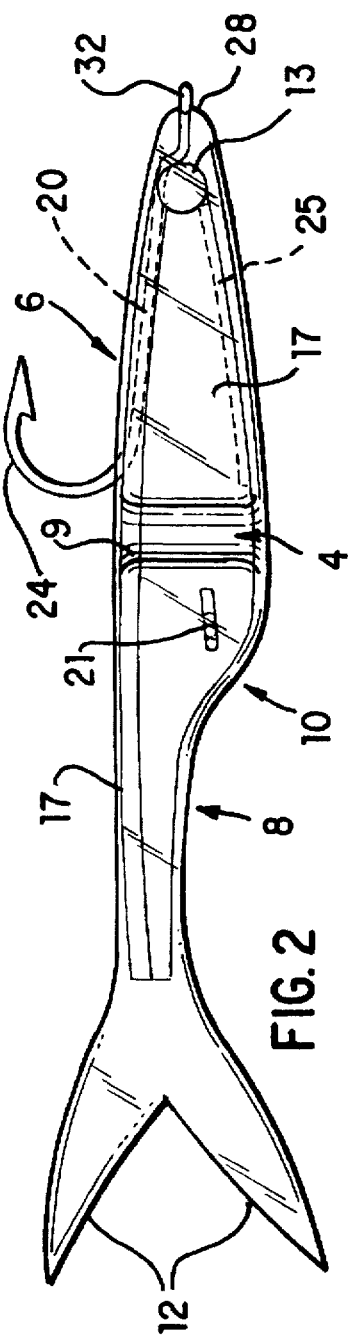
FIG. 2 is a starboard-side elevational view of the lure shown in FIG. 1.
Figure 3:
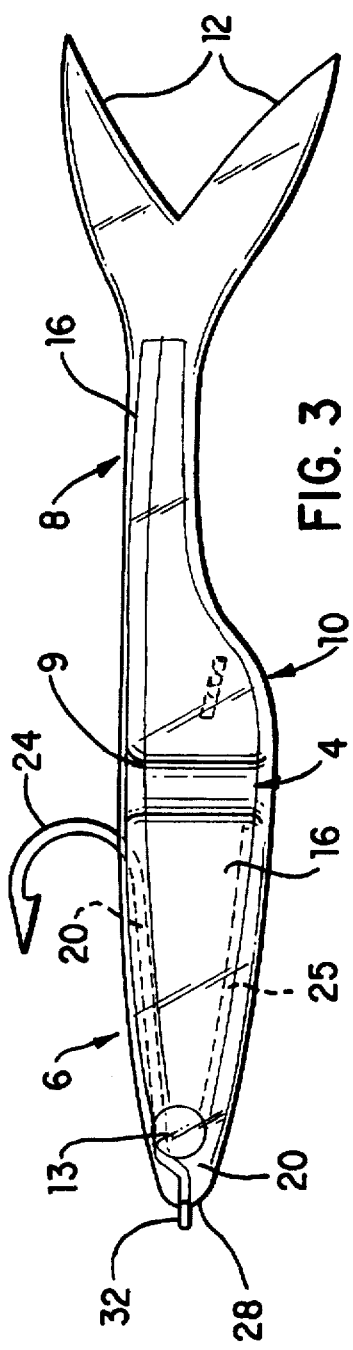
FIG. 3 is a port-side elevational view of the lure shown in FIG. 1.
Figure 9:
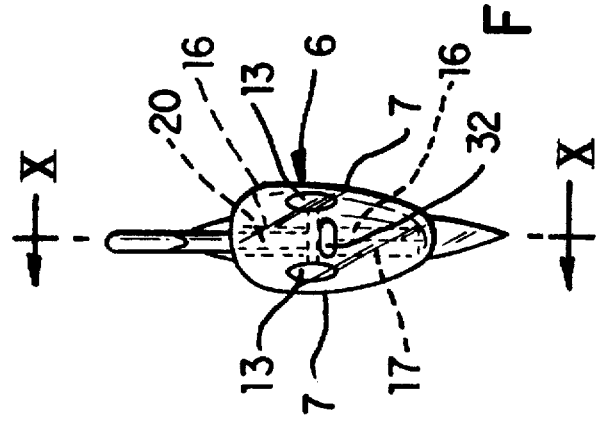
FIG. 9 is a forward elevational view of the lure shown in FIG. 6.
Figure 10:
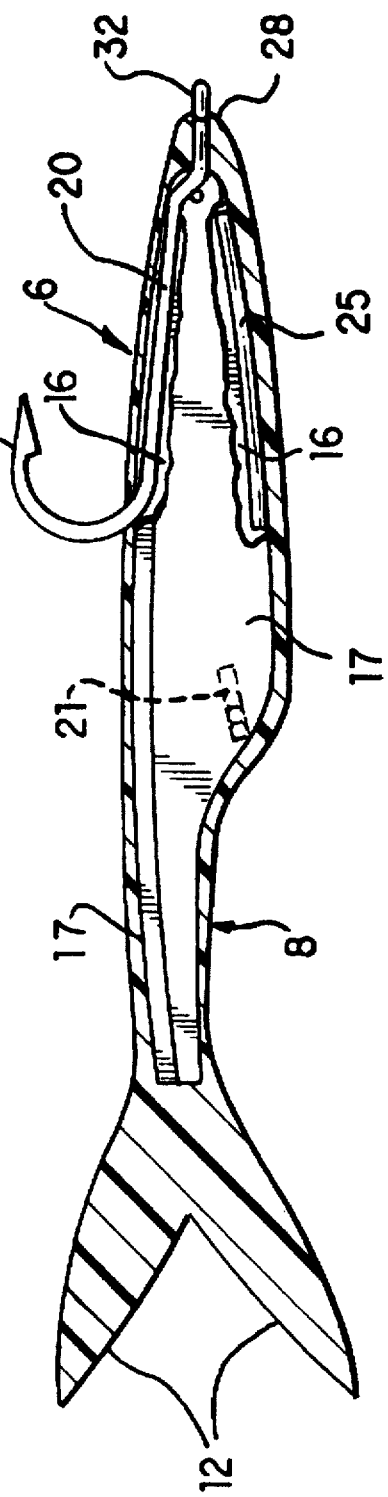
FIG. 10 is a starboard-side elevational view in cross-section taken on line X—X in FIG. 9.

Hook-shank 20 is embedded within forward body 6 and disposed approximately midway the width of forward body 6, as seen in from above in FIG. 1. As seen in FIGS. 2 and 3, hook-shank 20 is arranged longitudinally from nose 28, from which it protrudes to form eyelet 32, to just forward of buttons 13. Here, hook-shank 20 obliquely curves upward to just above buttons 13. Above buttons 13, hook-shank 20 extends rearwardly, essentially parallel to the top edge of forward body 6, to just forward of hinge 4 where it curves upwardly and forwardly in a general U-shape to project from forward body 6 and form fish-hook 24. Eyelet 32 provides means for a fishing line or leader to be attached to the lure. Fish-hook 24 is a barbed hook for catching fish.

Hook-shank 20 communicates the force of a fighting fish from hook 24 to eyelet 32 and hence the attached fishing line. Hook-shank 20 further functions to anchor hook 24 and eyelet 32 to the lure despite the forces created by a straggling fish. Hook-shank 20, hook 24 and eyelet 32 are one integral piece preferably made of strong, substantially rigid, metal wire.

Weight 25 is similarly embedded within forward body 6, near the lower surface and disposed midway within the width of forward body 6, as seen in FIGS. 1 and 4. Weight 25 extends rearwardly and obliquely from close proximity to hook-shank 20 in the forward part of forward body 6 to just forward of hinge 4, substantially parallel to the bottom edge of forward body 6, as seen in FIGS. 2, 3 and 5. The position and mass of weight 25 establishes the buoyant characteristics of the lure, sustains the lure in an upright position, and maintains stability while underwater. Weight 25 may be composed of metal, preferably lead.

As seen in FIG. 5, hook-shank 20 and weight 25 form a broken wish-bone within forward body 6, coinciding with the top and bottom portions of forward body 6.

It is conventional piscatorial knowledge that when a lure's head moves as widely as its tail, game fish perceive this as an unnatural movement and retreat from the lure. With hook-shank 20 and weight 25 so arranged, forward body 6, forward of hinge 4, is considerably more rigid and massive than aft body 10, tail 8 and fins 12, aft of hinge 4. This serves to dampen oscillations of the forward section of the body transmitted and created by the movements of aft body 10, tail 8 and fins 12, thus preventing forward body 6 from moving laterally widely as aft body 10, tail 8 or fins 12 as the lure moves relative to the surrounding water. This configuration also improves the casting qualities of the lure.

Importantly, the contours of sides 7 enhance the casting capabilities of the lure in conjunction with other of the lure's characteristics previously described. When a lure is to be cast to an area that, for example, is overhung by foliage, normal overhead casting is usually unproductive. It thus may be necessary to skip the lure across the water to avoid the overhanging foliage for the lure to reach its objective.

Skipping is the process in which an object with forward momentum strikes the surface of water at a slight acute angle so that it does not break the surface tension of the water and its forward momentum causes the object to bounce from the surface roughly at the same, but oppositely disposed angle at which it hit the surface. For the most efficient skipping, objects should strike the water's surface with a smooth, slightly convex surface, preferably with curved upper and lower edges. Sides 7 of forward body 6 are intentionally contoured for achieving this efficiency by being shaped in a smooth and slightly convex form with curved upper and lower edges, as seen in FIG. 4.

Referring to FIG. 1, hinge section 4 is formed by substantially indenting the width of forward body 6 at its aft portion to form opposing, trapezoidally configured notches 9 on both the port and starboard sides of forward body 6. The sides of notches 9 converge to their respective bases. The respective bases of notches 9 are generally parallel and spaced closely to each other. As seen in FIGS. 2 and 3, each base is, preferably, rectangular when view from the side. Referring to FIG. 1, the each base coincides with a plane but, alternatively, can be slightly curved outwardly when viewed from above.

Hinge section 4 increases the lateral flexibility of the section of the lure in which it is located. It is located about halfway the length of the lure, between the forward end of forward body 6, and the aft end of tail 8, excluding fins 12.

Notches 9 also serve to interrupt the laminar flow of water along sides 7 of the lure so that aft body 10, tail 8 and fins 12 are subjected to turbulent relative flow when drawn through water, causing them to move laterally from side to side in fish-like movements.

Molded integrally with and aft of hinge 4 is aft body 10. Aft body 10 has smooth, slightly convex sides with curved upper and lower edges which converge more abruptly and obliquely aft to relatively long and slim tail 8 which ends in a pair of vertically disposed fins 12.

Referring to FIGS. 2 and 3, visible from both side profiles of the lure is reflective, colorful and flexible ribbon 16. Shown in FIG. 2, strip 17 is visible from the starboard side profile of the lure. Ribbon 16 and strip 17 serve to attract the attention of game fish to the lure. Preferably, since the source of light for the lure is usually from above, ribbon 16 and strip 17 are multi-colored so that their top profile sections do not reflect appreciably more light than their bottom profile sections. In the embodiments shown, the reflective material of ribbon 16 and strip 17 are blue at their top sections and gold at their bottom sections, but other color combinations can be utilized.

Referring further to FIGS. 1 and 5, ribbon 16 is embedded throughout the longitudinal lengths and substantially spans the profile of forward body 6, hinge 4, aft body 10 and tail 8. Ribbon 16 is disposed longitudinally midway the width of aft body 10, tail 8 and hinge 4. Ribbon 16 is embedded within forward body 6, to the port side of, and secured by glue to hook-shank 20 and weight 25. As seen in FIG. 2, in forward body 6, the starboard profile of ribbon 16, hook-shank 20 and weight 25 is obscured by strip 17.

Importantly, foil 16 emphasizes lure movements by causing flash reflections of light as the lure moves relative to the surrounding water, thus, encouraging reflex strikes by game fish. Further, ribbon 16 adds strength to hinge 4 without significantly detracting from its lateral flexibility.

To obscure hook-shank 20 and weight 25 from view, and to maintain the reflective qualities of the lure, strip 17 is fastened by glue to ribbon 16 over hook-shank 20 and weight 25, shown in FIGS. 1 and 2. Strip 17 is preferably made from the same material as ribbon 16.

Referring again to FIGS. 1 and 4, two reflective buttons 13 are outwardly attached, either directly or via an axle between them, to ribbon 16 and strip 17, respectively, in the general location of fish eyes on the port and starboard sides of forward body 6. Buttons 13 are embedded a short distance within the material of forward body 6, so they are clearly visible outside the lure to attract a fish's attention and, at the same time, protected by the coveting of translucent silicone. Buttons 13 are preferably red and reflective with a black spot at their centers to simulate fish eyes.

Embedded within and near the surface of aft body 10 on either outboard-side of ribbons 16, is rattle 21. Rattle 21 is arranged so that when aft body 10 moves laterally, rattle 21 produces faint vibrations that simulate natural organic sounds made by fish, such as a beating fish heart, to be acoustically detectable in the water immediately surrounding the lure as a further enticement for game fish to strike the lure.

When the present invention is east so that the lure may skip, such as in a sidelong east, forward momentum in conjunction with air drag causes the weighted bottom portion of the lure to be disposed generally forwardly. Thus, sides 7 are disposed approximately parallel to the surface of the water. As gravity attracts the lure to the surface of the water while the lure retains forward momentum, side 7 that is on the bottom of the flying lure strikes the water first. Its smooth and slightly convex surface and curved upper and lower edges are designed to facilitate its skipping, that is, not breaking the surface tension of the water when the lure hits it at a slight acute angle. Accordingly, the lure then ricochets from the water approximately at a supplementary angle in the direction of the forward momentum. Because forward body 6 is relatively rigid, sides 7 are not appreciably deformed from the impact. Consequentially, the lure rebounds in the general direction of the cast and subsequent impacts on the surface of the water produce the same results until forward momentum is lost. Therefore, the lure can reach, by causing it to skip across the surface of the water, fishing areas that normally would be hard to enter.

Upon entering the water, the position and mass of weight 25 causes the lure to sink in a manner mimicking an injured fish with a range of velocity of approximately one foot per one to ten seconds (304.8 mm/1–10 sec).

Once the lure is underwater, it stabilizes in an upright position due to the location and mass of weight 25.

The tapered forward body 6 causes the lure to be pointed nose first into the relative flow of the water and to move in a fish-like manner. The angler, by pulling the lure back via the line in a jerking motion, causes the darting fish-like motion of the lure to be intensified.

Grooves 9 disrupts the laminar flow along the sides of the fish so that aft body 10, tail 8 and fins 12, react to turbulent flow along their sides and mimic the motion of fish tails and fins. Further, hinge 4 deforms laterally in response to hydrodynamic forces to enhance the mimicry of fish-like movements.

As the lure is mimicking fish-like movements, ribbon 16 and strip 17 are reflecting light attracting game fish's attention. The light is reflected in varying degrees throughout the lure as ribbon 16 is bent in relation to sources of light; hence at intervals of time, portions of the lure's sides flash reflected light, accentuating fish-like movements of the lure to entice a game fish's reflex strikes.

Analysis has shown that the lure is especially effective in capturing redfish, shook and salt-water trout. Further, the lure has been found to maintain its utility after catching as many as forty fish which is unusual and unexpected for a lure of this type. It is considered that the durability of the silicone and the manner in which the hook is embedded in the body contribute to this result.

FIGS. 6 through 10 show another embodiment of the present invention without hinge 4 and aft body 10 but which is otherwise similar to the embodiment shown in FIGS. 1 through 5 and the same reference numerals are used to identify the same parts. In this embodiment, rattle 21 is embedded in the area of forward body 6 that defines the connection to tail 8. Weight 25 and hook-shank 20 do not traverse this section that connects forward body 6 to tail 8. This aft section of forward body 6 abruptly and obliquely tapers to tail 8, while maintaining smooth and slightly convex sides with curved upper and lower edges. Thus, the fish-like movements of the lure continue to be governed by the forces of the water acting primarily on flexible tail 8 including fins 12, albeit, in a more subdued fashion that is otherwise governed by the thickness and shape of hinge 4 and notches 9.

The method of preparing the lure is as follows:

First, a ribbon 16 is cut from a sheet of material that is flexible, reflective and colorful on both sides in the general but slightly smaller shape of the lure's profile excluding fins 12.

Next, hook-shank 20 is glued to the section of ribbon 16 that corresponds to forward body 6 and so that eyelet 32 projects from the nose of ribbon 16 and hook 24 remains forward of the section of ribbon 16 corresponding to hinge 4 and projects appropriately beyond the top of ribbon 16 as shown. Weight 25 is then fastened by glue to the lower edge of ribbon 16, again, in the section that corresponds to forward body 6 forward of hinge 4. Hook-shank 20 and weight 25 are arranged essentially to define, respectively, the upper and lower edges of ribbon 16 that corresponds to forward body 6. Further, rattle 21 is glued to the section of the ribbon that coincides with aft body 10.

From the same material from which ribbon 16 was taken, strip 17 is cut therefrom to be congruent to the section of ribbon 16 that now supports hook-shank 20 and weight 25.

Strip 17 is next secured to ribbon 16, hook-shank 20 and weight 25 by glue so that it coincides with ribbon 16 and obscures hook-shank 20 and weight 25 from apparent view.

Eye-buttons 13 are then glued on ribbon 16 and strip 17, directly or via a short axle connecting them together through ribbon 16 and strip 17, at the general location of fish eyes.

The glued assembly is next permitted to set.

A two-piece mold which defines impressions which will form the lure in its desired shape is sprayed on its mating surfaces and in its depressions with a non-stick cooking spray.

Molten silicone is injected into top and bottom halves of the mold.

Previously glued assembly is placed onto the molten silicone in the bottom half of the mold.

The top half of the mold is then carefully placed, with the molten silicone therein, onto the bottom half until properly in place.

The silicone is allowed to harden.

The top half of mold is next removed from bottom half and the lure is taken out.

Finally, excess silicone is removed from the lure which is then washed and allowed to cure.

Although a description of the embodiments and the process of making them is set forth above, there are various modifications and substitutions which will occur to those skilled in the art within the spirit and scope of this invention. For example, fish-hook 24 may be of any known design appropriate for the particular game fish sought. Also, by arranging the disposition of hook-shank 20 and hook 24 so that neither overlap weight 25, hook 24 may project from the bottom of forward body 6. Further, the size and configuration of the lure may be modified to resemble other aquatic creatures which serve as attractive bait for the game fish being sought. Still further, the material of the colorful, flexible and reflective ribbon 16 and strip 17 should not only be colorful and reflect light, but also strengthen and maintain the flexibility of hinge 4, if any, while obscuring hook-shank 20 and weight 25 from sight, and may be composed of a variety of materials and configurations having differing reflective characteristics and/or degrees of flexibility.

Having disclosed my invention, what I claim as new and to be secured by Letters Patent of the United States is:

1. A fish lure, molded from translucent, flexible material to form a single unit in a general shape of a fish comprising;
   a forward body part, a hinge, an aft body part, a tail and fins,
      said forward body part comprising a top side, a bottom side, two lateral sides, a nose end and a rear end,
      said top, bottom and lateral sides connecting said nose and rear ends,
      said top, bottom and lateral sides converging from forward said rear end to proximate said nose, said lateral sides smooth and slightly convex, said forward body part further comprising a hook and a weight,
- said hook embedded in and projecting from said translucent, plastic, flexible material of said forward body part,
- said hook shank embedded in said translucent, plastic, flexible material proximate to and approximately parallel to said top side,
- said hook projecting from said translucent, plastic, flexible material at said top side forward of said rear end,
- said hook also projecting from said nose end to form an eyelet,
- said weight fully embedded in said translucent, plastic, flexible material of said forward body part,
- said weight embedded in said translucent, plastic, flexible material proximate to and approximately parallel to said bottom side, said rear end connected to said hinge, said hinge comprising a forward end and an aft end,
- said forward end connected to said rear end of said forward body part,
- said hinge further comprising, between said forward end and said aft end, an indentation whereby said lure is substantially thinner, in respect to said lure's width, and more laterally flexible than said forward and said aft body part,
- said aft end connected to said aft body part, said aft body part comprising a top, bottom and two side surfaces, and a front end and a tail end,
- said front end connected to said at end of said hinge,
- said surfaces of said aft body part connecting said from end and said tail end,
- said surfaces converging from proximate said front end to said tail end, said aft body part further comprising a rattle,
- said rattle embedded in said translucent, plastic, flexible material of said aft body part near at least one said surface and proximate to said front end,
- said rattle disposed whereby lateral movement of said aft body produces from said rattle an intermittent noise which is acoustably audible underwater, said tail end connected to said tail, said tail comprising an anterior end and a posterior end,
- said anterior end connected to said tail end of said aft body part,
- said posterior end connected to said fins, said fish lure further comprising a flexible, reflective ribbon,
- said flexible, reflective ribbon embedded within said translucent, plastic, flexible material of said lure and longitudinally disposed from proximate said nose end to said tail end and vertically transversely disposed therebetween substantially filling both profile views of said lure, and disposed approximately midway said lure's width,
- said reflective, flexible ribbon being substantially completely visible when viewing said lure in profile from either side, and
- said flexible, reflective ribbon is disposed in said forward body part,
- said flexible, reflective ribbon substantially obscuring said weight from either of said lateral sides, and said flexible, reflective ribbon substantially obscuring said hook, from either of said lateral sides, wherein said hook shank is embedded in said translucent, plastic, flexible material of said forward body part.

2. A fish lure in accordance with claim 1, wherein said translucent, plastic, flexible material is composed of silicone.

3. A fish lure in accordance with claim 1, wherein the height of said forward body part is greater than the thickness of said forward body part.

4. A fish lure in accordance with claim 1, wherein the height of said aft body part is greater than the thickness of said aft body part.

* * * * *